US00RE46011E

(19) United States
(12) Reissued Patent
Huber

(10) Patent Number: US RE46,011 E
(45) Date of Reissued Patent: May 24, 2016

(54) LOCKING ADJUSTMENT DIAL MECHANISM FOR RIFLESCOPE

(71) Applicant: Lightforce USA, Inc., Orofino, ID (US)

(72) Inventor: Jeff Huber, Orofino, ID (US)

(73) Assignee: Lightforce USA, Inc., Orofino, ID (US)

(21) Appl. No.: 14/636,478

(22) Filed: Mar. 3, 2015

Related U.S. Patent Documents

Reissue of:

(64) Patent No.: 8,407,927
Issued: Apr. 2, 2013
Appl. No.: 13/331,599
Filed: Dec. 20, 2011

U.S. Applications:

(63) Continuation-in-part of application No. 12/363,658, filed on Jan. 30, 2009, now Pat. No. 8,104,217.

(60) Provisional application No. 61/063,265, filed on Jan. 31, 2008, provisional application No. 61/144,400, filed on Jan. 13, 2009.

(51) Int. Cl.
*F41G 1/38* (2006.01)

(52) U.S. Cl.
CPC ..... *F41G 1/38* (2013.01)

(58) Field of Classification Search
CPC ..... F41G 1/38; F41G 1/82
USPC ..... 42/122, 130, 119, 120, 22, 125, 126; 359/405, 410, 428, 429
See application file for complete search history.

(56) References Cited

U.S. PATENT DOCUMENTS

| | | | |
|---|---|---|---|
| 1,344,973 | A | 6/1920 | Bader |
| 2,105,564 | A | 1/1938 | Vaver |
| 2,143,167 | A | 1/1939 | Pechar |
| 2,165,796 | A | 7/1939 | Humeston |
| 2,208,913 | A | 7/1940 | Unertl |
| 2,229,637 | A | 1/1941 | Burton |

(Continued)

FOREIGN PATENT DOCUMENTS

| | | | |
|---|---|---|---|
| CN | 2752794 | Y | 1/2006 |
| CN | 201780052 | U | 3/2011 |

(Continued)

OTHER PUBLICATIONS

International Search Report & Written Opinion, International Application No. PCT/US2013/020062, dated Apr. 25, 2013, 13 pgs.

(Continued)

*Primary Examiner* — Jeffrey R Jastrzab
(74) *Attorney, Agent, or Firm* — Wood Herron & Evans LLP

(57) ABSTRACT

Described is a locking stop mechanism for a riflescope that includes at least one rotatable reticle adjustment dial mounted on a scope body. It includes a stop member on the adjustment dial at a preselected position and a lock member on the scope body. The lock member is positioned to engage the stop member upon rotation of the adjustment dial to a preselected setting. The lock member is configured to prevent rotation of the adjustment dial in either direction when engaged with the stop member while allowing free rotation in at least one direction when the lock member is manually displaced and when the stop member is not engaged with the lock member at the preselected setting.

12 Claims, 13 Drawing Sheets

NEW

(56) References Cited

U.S. PATENT DOCUMENTS

| | | | |
|---|---|---|---|
| 2,336,107 | A | 12/1943 | Litschert |
| 2,452,592 | A | 11/1948 | Meyer |
| 2,583,042 | A | 1/1952 | Dayton |
| 2,585,933 | A | 2/1952 | Harvey |
| 2,682,707 | A | 7/1954 | Dahlberg |
| 2,704,466 | A | 3/1955 | Way |
| 2,913,826 | A | 11/1959 | Petty |
| 3,037,287 | A | 6/1962 | Glatz et al. |
| 3,058,391 | A | 10/1962 | Leupold |
| 3,161,716 | A | 12/1964 | Burris et al. |
| 3,222,987 | A | 12/1965 | Wrigglesworth |
| 3,280,463 | A | 10/1966 | Stadler |
| 3,297,389 | A | 1/1967 | Gibson |
| 3,471,932 | A | 10/1969 | Luning |
| 3,662,618 | A | 5/1972 | Kroll et al. |
| 3,707,204 | A | 12/1972 | Dussardier |
| 3,826,012 | A | 7/1974 | Pachmayr |
| 3,916,721 | A | 11/1975 | Egger |
| 3,990,155 | A | 11/1976 | Akin, Jr. et al. |
| 3,999,442 | A | 12/1976 | Decker et al. |
| 4,012,966 | A | 3/1977 | Lieberman et al. |
| 4,026,397 | A | 5/1977 | Raus |
| 4,038,757 | A | 8/1977 | Hicks et al. |
| 4,132,129 | A | 1/1979 | Pratt |
| 4,139,268 | A | 2/1979 | Litman |
| 4,154,125 | A | 5/1979 | Frank |
| 4,190,325 | A | 2/1980 | Moreno |
| 4,200,355 | A | 4/1980 | Williams, Jr. |
| 4,201,096 | A | 5/1980 | Morrison et al. |
| 4,247,161 | A | 1/1981 | Unertl, Jr. |
| 4,347,758 | A | 9/1982 | Geil et al. |
| 4,373,269 | A | 2/1983 | Doliber et al. |
| 4,389,791 | A | 6/1983 | Ackerman |
| 4,408,842 | A | 10/1983 | Gibson |
| 4,457,076 | A | 7/1984 | Heck |
| 4,461,330 | A | 7/1984 | Judkins |
| 4,643,542 | A | 2/1987 | Gibson |
| 4,709,311 | A | 11/1987 | Bornhorst |
| 4,779,305 | A | 10/1988 | Gorsek |
| 4,955,253 | A | 9/1990 | Sakai et al. |
| 4,982,502 | A | 1/1991 | Weyrauch |
| 5,020,389 | A | 6/1991 | Sigler |
| 5,083,477 | A | 1/1992 | Geil |
| 5,121,653 | A | 6/1992 | Sigler |
| 5,152,187 | A | 10/1992 | LaFemina |
| 5,329,829 | A | 7/1994 | Sell |
| 5,363,559 | A | 11/1994 | McCarty |
| 5,433,010 | A | 7/1995 | Bell |
| 5,499,456 | A | 3/1996 | Tomita |
| 5,513,440 | A | 5/1996 | Murg |
| 5,586,569 | A | 12/1996 | Hanning et al. |
| 5,615,487 | A | 4/1997 | Tomita |
| 5,618,374 | A | 4/1997 | Byerley |
| 5,695,125 | A | 12/1997 | Kumar |
| 5,715,607 | A | 2/1998 | Murg |
| 5,745,287 | A | 4/1998 | Sauter |
| 5,771,595 | A | 6/1998 | Bell |
| 5,862,715 | A | 1/1999 | Lemire |
| 5,892,617 | A | 4/1999 | Wallace |
| 5,906,141 | A | 5/1999 | Abdelmoula |
| 5,930,934 | A | 8/1999 | Fisher et al. |
| 6,005,711 | A | 12/1999 | Mai et al. |
| 6,279,259 | B1 | 8/2001 | Otteman |
| 6,351,907 | B1 | 3/2002 | Otteman |
| 6,442,854 | B1 | 9/2002 | Liu et al. |
| 6,508,144 | B1 | 1/2003 | Vendetti et al. |
| 6,519,890 | B1 | 2/2003 | Otteman |
| 6,588,125 | B2 | 7/2003 | Proctor, Sr. |
| 6,643,970 | B2 | 11/2003 | Huber |
| 6,691,447 | B1 | 2/2004 | Otteman |
| 6,705,037 | B2 | 3/2004 | Van Kirk |
| 6,721,095 | B2 | 4/2004 | Huber |
| 6,772,550 | B1 | 8/2004 | Leatherwood |
| 6,848,628 | B2 | 2/2005 | Walker |
| 6,860,442 | B2 | 3/2005 | Datcuk, Jr. |
| 6,862,832 | B2 | 3/2005 | Barrett |
| 7,117,624 | B2 | 10/2006 | Kim |
| 7,121,037 | B2 | 10/2006 | Penney |
| 7,330,310 | B2 | 2/2008 | Hengst et al. |
| 7,612,952 | B2 | 11/2009 | Schafer |
| 7,640,830 | B2 | 1/2010 | Bonis |
| 7,827,723 | B1 | 11/2010 | Zaderey et al. |
| 7,997,163 | B2 * | 8/2011 | Casas ..... 74/553 |
| 8,006,429 | B2 | 8/2011 | Windauer |
| 8,112,933 | B1 * | 2/2012 | Swan ..... 42/127 |
| 8,201,487 | B2 | 6/2012 | Dueck et al. |
| 8,270,104 | B2 | 9/2012 | Windauer |
| 8,479,402 | B2 | 7/2013 | Schmitt |
| 2002/0159148 | A1 | 10/2002 | Huber |
| 2003/0140545 | A1 | 7/2003 | Huber |
| 2004/0008421 | A1 | 1/2004 | Yoshida et al. |
| 2004/0088898 | A1 | 5/2004 | Barrett |
| 2004/0144013 | A1 | 7/2004 | Leatherwood |
| 2006/0254115 | A1 | 11/2006 | Thomas et al. |
| 2006/0268433 | A1 | 11/2006 | Thomas |
| 2006/0278035 | A1 | 12/2006 | Casas |
| 2007/0240356 | A1 | 10/2007 | Klepp et al. |
| 2008/0066364 | A1 | 3/2008 | Klepp et al. |
| 2008/0236018 | A1 | 10/2008 | Halverson |
| 2009/0199452 | A1 | 8/2009 | Huber |
| 2009/0205461 | A1 | 8/2009 | Windauer |
| 2010/0175298 | A1 | 7/2010 | Thomas et al. |
| 2011/0061285 | A1 | 3/2011 | Hamilton |
| 2011/0100152 | A1 | 5/2011 | Huynh |
| 2011/0102918 | A1 | 5/2011 | Windauer |
| 2011/0242650 | A1 | 10/2011 | Windauer |
| 2011/0261449 | A1 | 10/2011 | Schmitt |
| 2013/0167425 | A1 | 7/2013 | Crispin |

FOREIGN PATENT DOCUMENTS

| | | | |
|---|---|---|---|
| DE | 2148967 | A1 | 4/1973 |
| DE | 19642796 | A1 | 5/1997 |
| DE | 29720737 | U1 | 2/1998 |
| DE | 29903989 | U1 | 6/1999 |
| DE | 20301749 | U1 | 4/2003 |
| DE | 10222528 | A1 | 12/2003 |
| DE | 202006003770 | U1 | 7/2006 |
| GB | 598306 | A | 2/1948 |
| GB | 708438 | A | 5/1954 |
| GB | 1102022 | A | 2/1968 |
| GB | 1214584 | A | 12/1970 |
| GB | 2213959 | A | 8/1989 |
| JP | 1184210 | A | 3/1999 |
| JP | 11085290 | A | 3/1999 |
| JP | 2003222499 | A | 8/2003 |
| JP | 2004150699 | A | 5/2004 |
| WO | 2006060490 | A2 | 6/2006 |
| WO | 2006109587 | A1 | 10/2006 |
| WO | 2010008810 | A2 | 1/2010 |
| WO | 2013102869 | A1 | 7/2013 |
| WO | 2013102872 | A1 | 7/2013 |

OTHER PUBLICATIONS

Article: Bayonet Mount, Answers.com Encyclodictionalmanacapedia, http://www.answers.com/topic/bayonet-mount, visited Sep. 28, 2006, 5 pages.

International Search Report and Written Opinion, International Patent Applicaiton No. PCT/ US2005/043336, mailed Jul. 7, 2008, 4 pages.

* cited by examiner

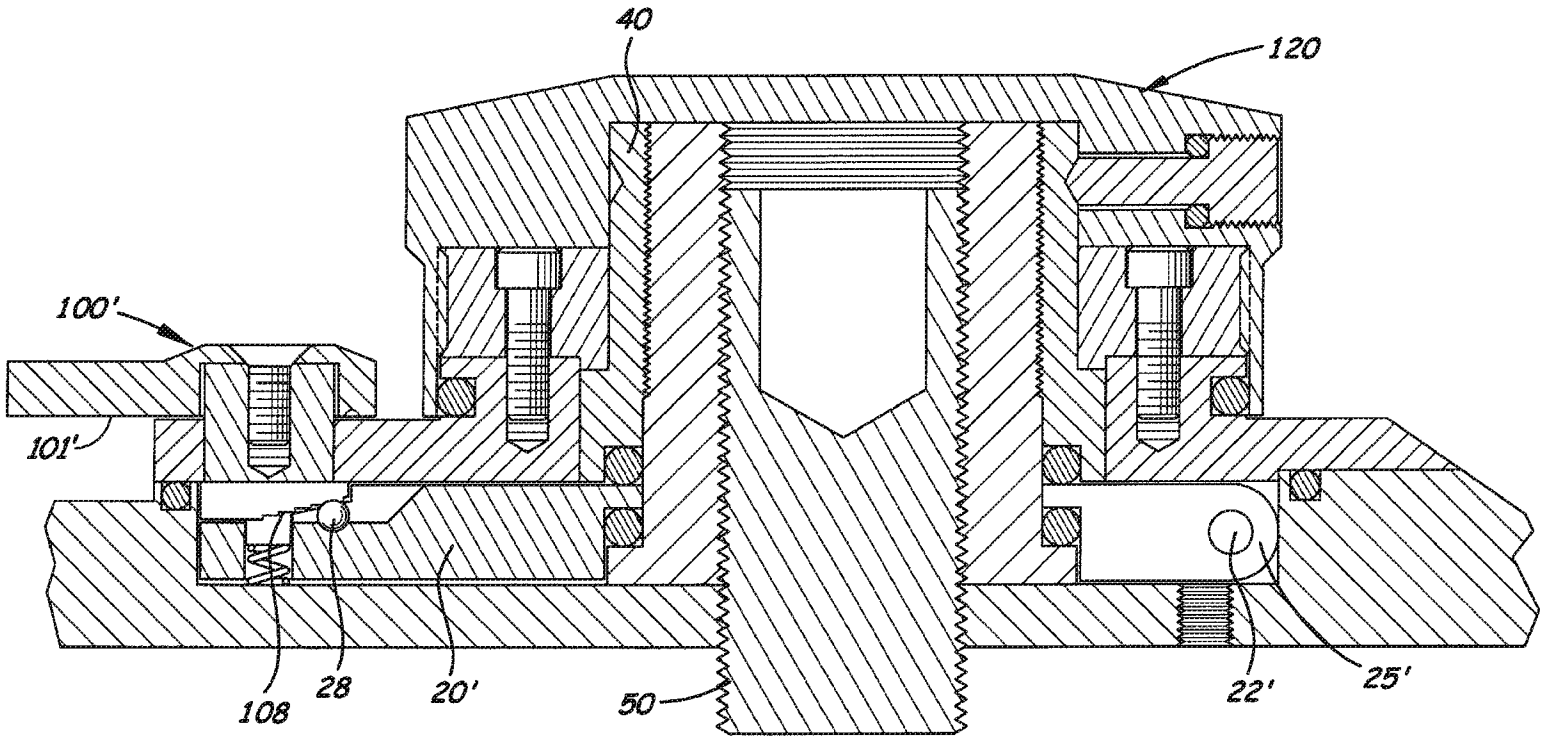
Fig. 7
Amended

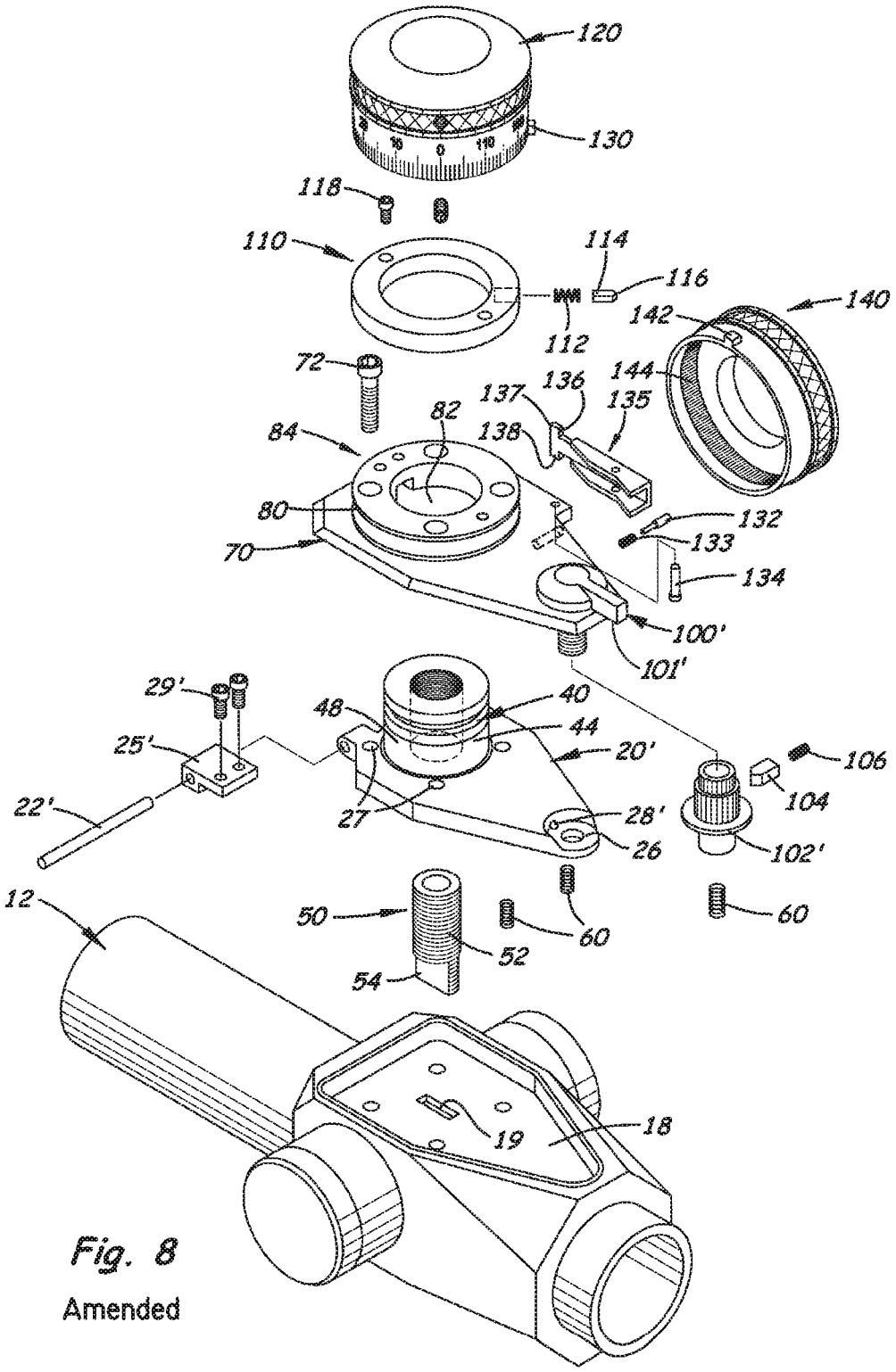
Fig. 8
Amended

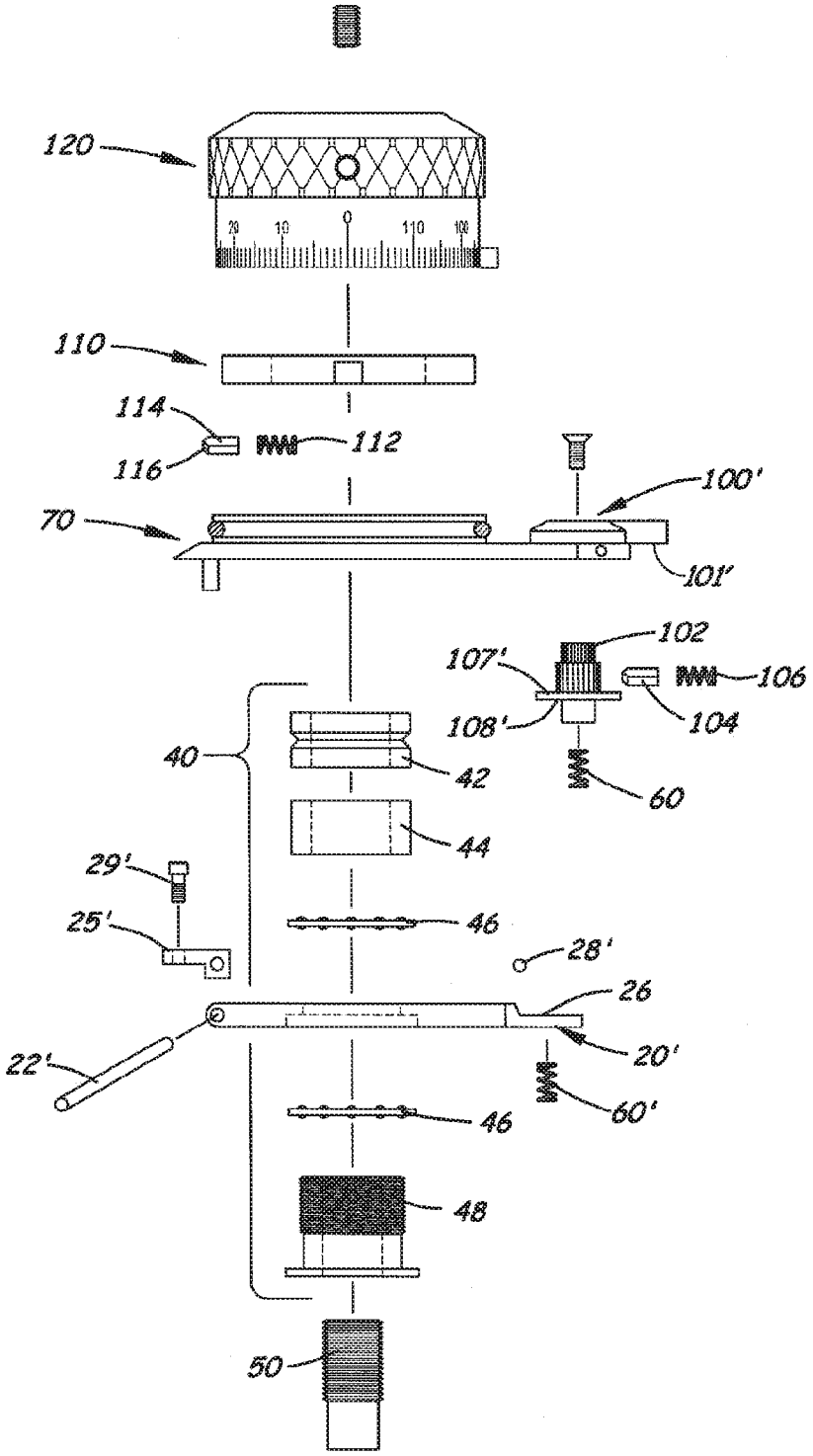
Fig. 9
Amended

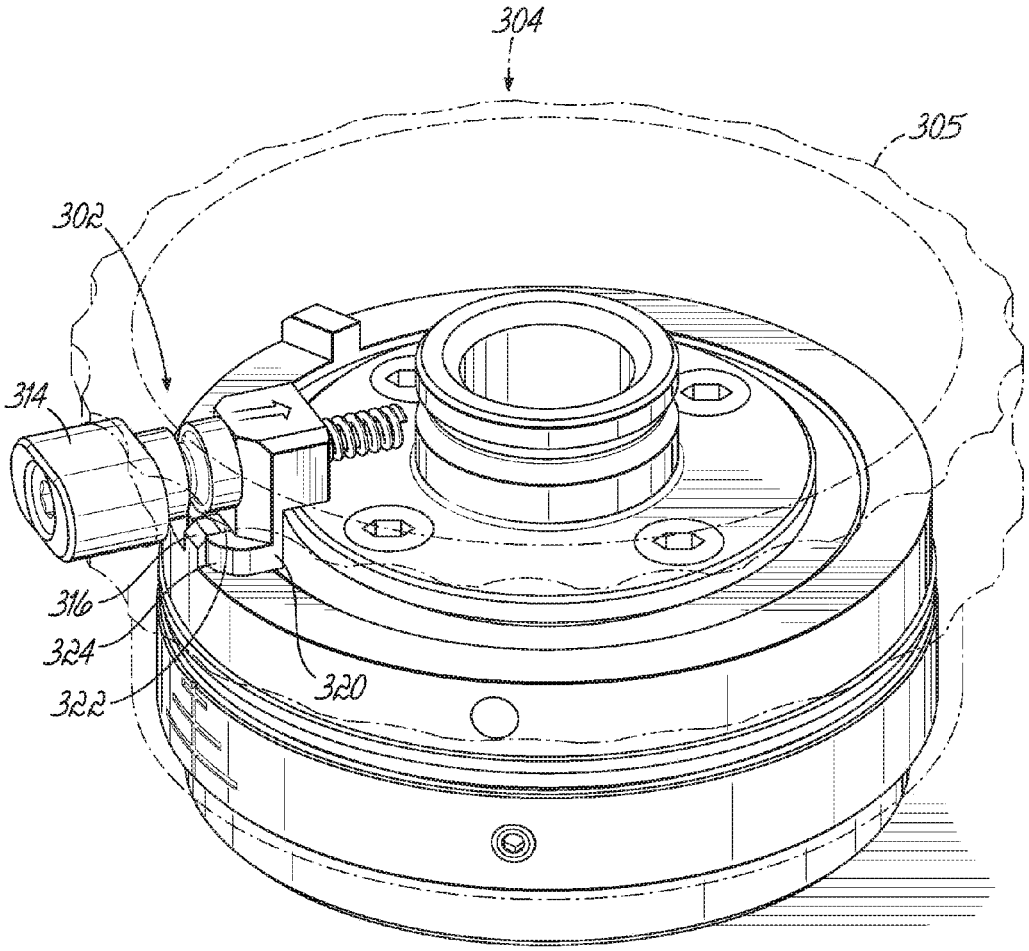
FIG. 20
NEW

LOCKING ADJUSTMENT DIAL MECHANISM FOR RIFLESCOPE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

This application is a *reissue application of U.S. Pat. No. 8,407,927, titled Locking Adjustment Dial Mechanism For Riflescope* (*U.S. patent application Ser. No. 13/331,599, filed Dec. 20, 2011, which is a* continuation-in-part of [my co-pending] U.S. patent application Ser. No. 12/363,658, titled Riflescope High Speed Adjusting Elevation Assembly, filed Jan. 30, 2009 and claiming priority to U.S. provisional patent application Ser. No. 61/063,265, filed on Jan. 31, 2008, and Ser. No. 61/144,400, filed on Jan. 13, 2009), *which is hereby incorporated by reference herein in its entirety*.

1. Technical Field

This invention pertains to riflescopes and more particularly to riflescopes with elevation and/or windage adjustment knobs that can be releasably locked at a preselected "zero" position.

2. Description of the Related Art

Riflescopes typically include elevation adjustments that enable the shooter to shoot accurately at different target distances by turning the elevation adjustment mounted on the top of the riflescope. When the elevation adjustment is rotated, the riflescope's elevation changes from the scope's zero point. Conventional elevation adjustments on a riflescope have preset "click" values which determine the amount of elevation change when the adjustment is rotated one click or to a pre-determined mark on the adjustment. Most elevation adjustment knobs have a click value of ¼, ½, or 1 minute of angle (MOA) or milliradian or some other measurement unit.

The smaller the click value, the greater number of rotations must be made to the elevation adjustment to adjust to different target distances. This can create a slow and confusing situation for the shooter because the dial position must be counted and does not reflect the actual scope adjustment setting, thereby slowing engagement time with the target. If the elevation adjustment has relatively small MOA (or milliradian) click values, the total amount of elevation movement per rotation of the adjustment, is limited. When the riflescope has a relatively large click value, the amount of elevation change in one rotation is greater thereby enabling the shooter to quickly adjust the scope for different distances.

Some riflescope adjustment mechanisms include a stop feature that allows the user to selectively set a position beyond which the adjustment dial cannot be rotated in one direction. This creates a stop point corresponding to a "zero" setting for the adjustment dial. Such a feature is shown in my prior U.S. Pat. No. 6,643,970, issued Nov. 11, 2003. Once set, this type of stop feature does not allow the adjustment dial to be rotated beyond the preselected "zero" point to a "negative" range. Others have created locking adjustment dials that can be rotated in either direction only when the user disengages a locking mechanism. Examples are shown in U.S. Patent Application Publication Nos. 2011/0100152, published May 5, 2011, and 2009/0205461, published Aug. 20, 2009, both assigned to Leupold & Stevens, Inc. of Beaverton, Ore. These lock at every selected adjustment position and do not provide a mechanical stop or non-visual indication when the adjustment dial reaches the "zero" position.

What is needed is a riflescope with an adjustment assembly that allows the shooter to return to the zero setting easier than conventional adjustments, even by feel, without visual confirmation of the settings. Moreover, what is needed is such an adjustment assembly that locks in the preselected zero setting, but which allows the user to adjust the dial, upon manually disengaging the lock, beyond that point into a "negative" elevation range or that locks in the preselected zero windage setting, but which allows the user to adjust the dial either left or right of the center windage setting.

SUMMARY

These and other objects of the invention are met by the riflescope locking adjustment dial assembly disclosed herein that includes a locking stop mechanism for a riflescope with at least one rotatable reticle adjustment dial mounted on a scope body. It includes a stop member on the adjustment dial at a preselected position and a lock member on the scope body. The lock member is positioned to engage the stop member upon rotation of the adjustment dial to a preselected setting. The lock member is configured to prevent rotation of the adjustment dial in either direction when engaged with the stop member while allowing free rotation in at least one direction when the lock member is manually displaced and when the stop member is not engaged with the lock member at the preselected setting.

According to one embodiment, stop tabs are mounted on the side of the coarse adjustment dial and the windage dial, which are engaged by locking arms mounted on the scope body. During use, the tabs and release arms are used to create a zero point for the riflescope. When pressed, the locking arms disengage from the stop tabs and allows the coarse elevation dial and the windage dial to rotate freely in either direction beyond the pre-defined zero point. When the coarse elevation dial or the windage dial are rotated back to their original location, the locking arms re-engage the stop tabs automatically resetting the original zero point, locking both elevation and windage turrets, thus preventing accidental change to the shooters original zero point.

Other features or aspects of the invention may include that the lock member has at least one cam surface configured to cause displacement of the lock member when contacted by the stop member as the adjustment dial is rotated to the preselected setting. The adjustment dial may include rotational position graduation indicia such that the preselected setting corresponds to a zero position of the adjustment dial. The dial may be selectably positionable such that any setting within a reticle's range of adjustment can be selected as the preselected zero position. Also, at least one of the stop member and lock member may be configured not to engage with the other upon a full rotation from the preselected setting or the adjustment dial may be configured such that a reticle's full range of adjustment is achieved by a single rotation of the adjustment dial. The adjustment dial may be configured to allow rotation in either direction from the preselected setting when the lock member is manually displaced.

BRIEF DESCRIPTION OF THE DRAWINGS

FIG. 7 is a sectional, side elevational view of a second embodiment of the high speed, adjustable elevation assembly.

FIG. 8 is an isometric, exploded view of the high speed, adjustable elevation assembly shown in FIG. 7.

FIG. 9 is an exploded, side elevational view of the high speed, adjustable elevation assembly shown in FIGS. 7 and 8.

*FIG. 20 is a fragmentary isometric view showing an alternate embodiment with a lock member on the elevation and windage adjustment assembly and stop members associated with the scope body.*

DESCRIPTION OF THE PREFERRED EMBODIMENTS

Figure 1:
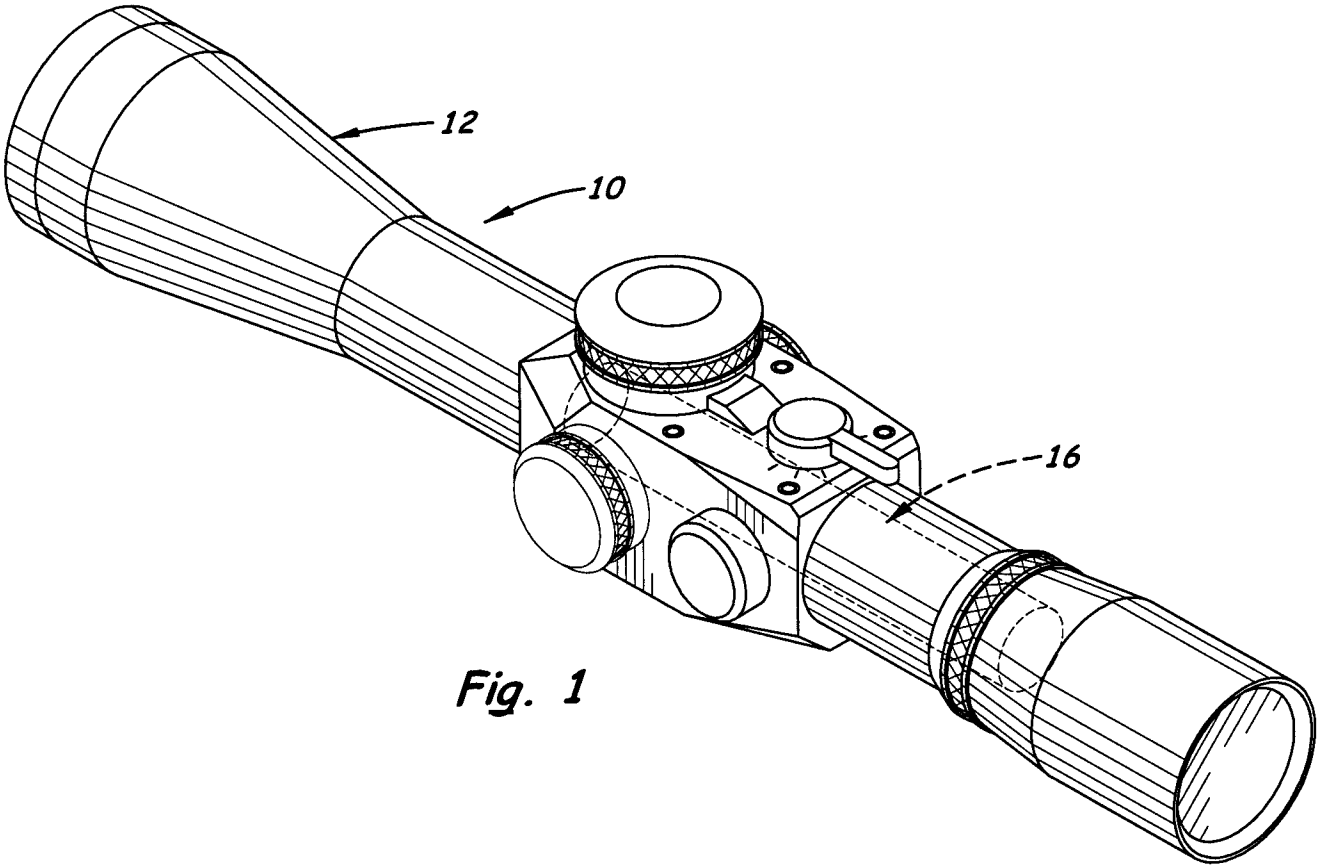
FIG. 1 is an isometric view of a riflescope with the high speed, adjustable elevation assembly mounted thereon.
Figure 2:
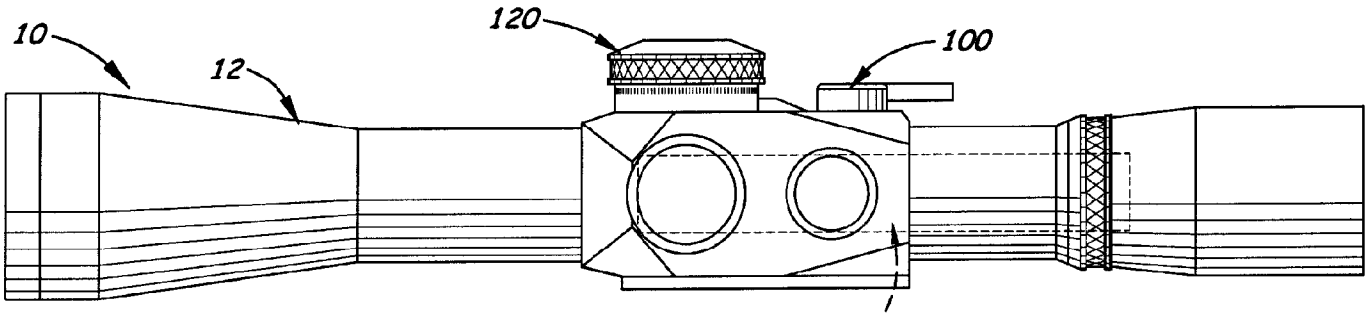
FIG. 2 is a side elevational view of the riflescope shown in FIG. 1.
Figure 3:
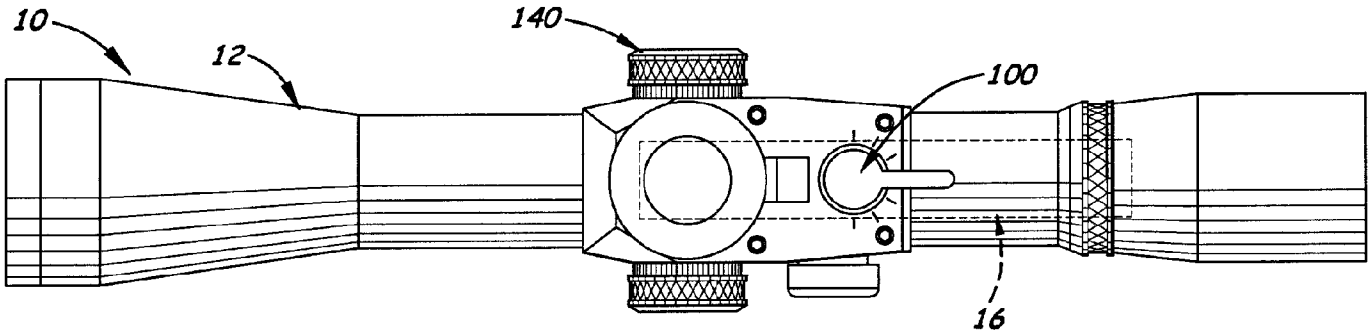
FIG. 3 is a top plan view of the riflescope shown in FIGS. 1 and 2.

Referring to the FIGS. 1-15, there is shown a riflescope high speed, coarse and fine adjustment assembly disclosed herein that includes a riflescope 10 with an elongated scope body 12 with an erector tube 16 located therein. Formed on the scope body 12 is a recessed mounting surface 18 (shown as part of a saddle) designed to receive an adjustment plate.

Disposed over the mounting surface 18 is an adjustment plate with a perpendicularly aligned rotating post member 40 disposed thereover. The post member 40 includes a threaded bore 43 designed to connect to the upper threaded head 52 of the lead screw 50.

Figure 4:
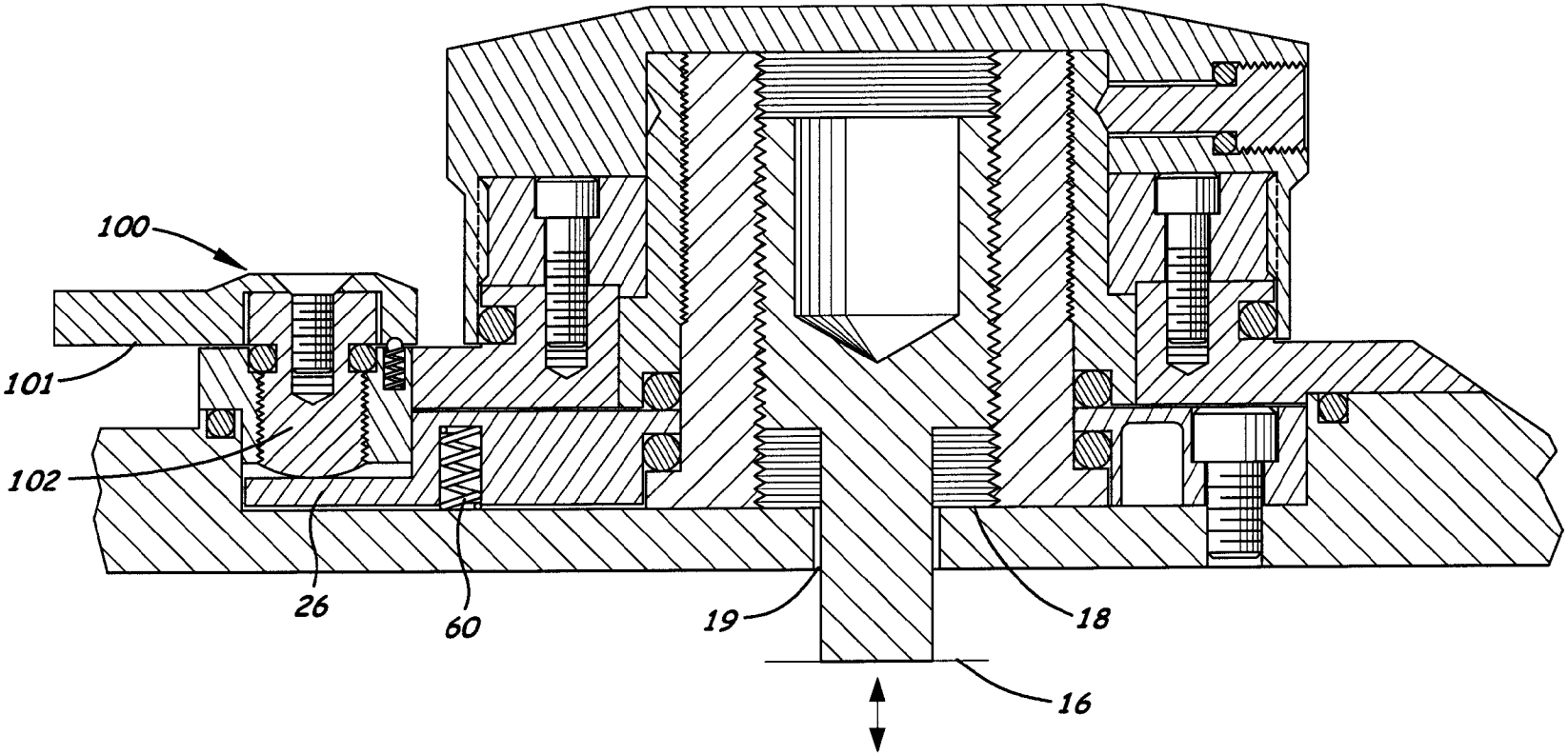
FIG. 4 is a sectional, side elevational view of the first embodiment of the high speed, adjustable elevation assembly.
Figure 5:
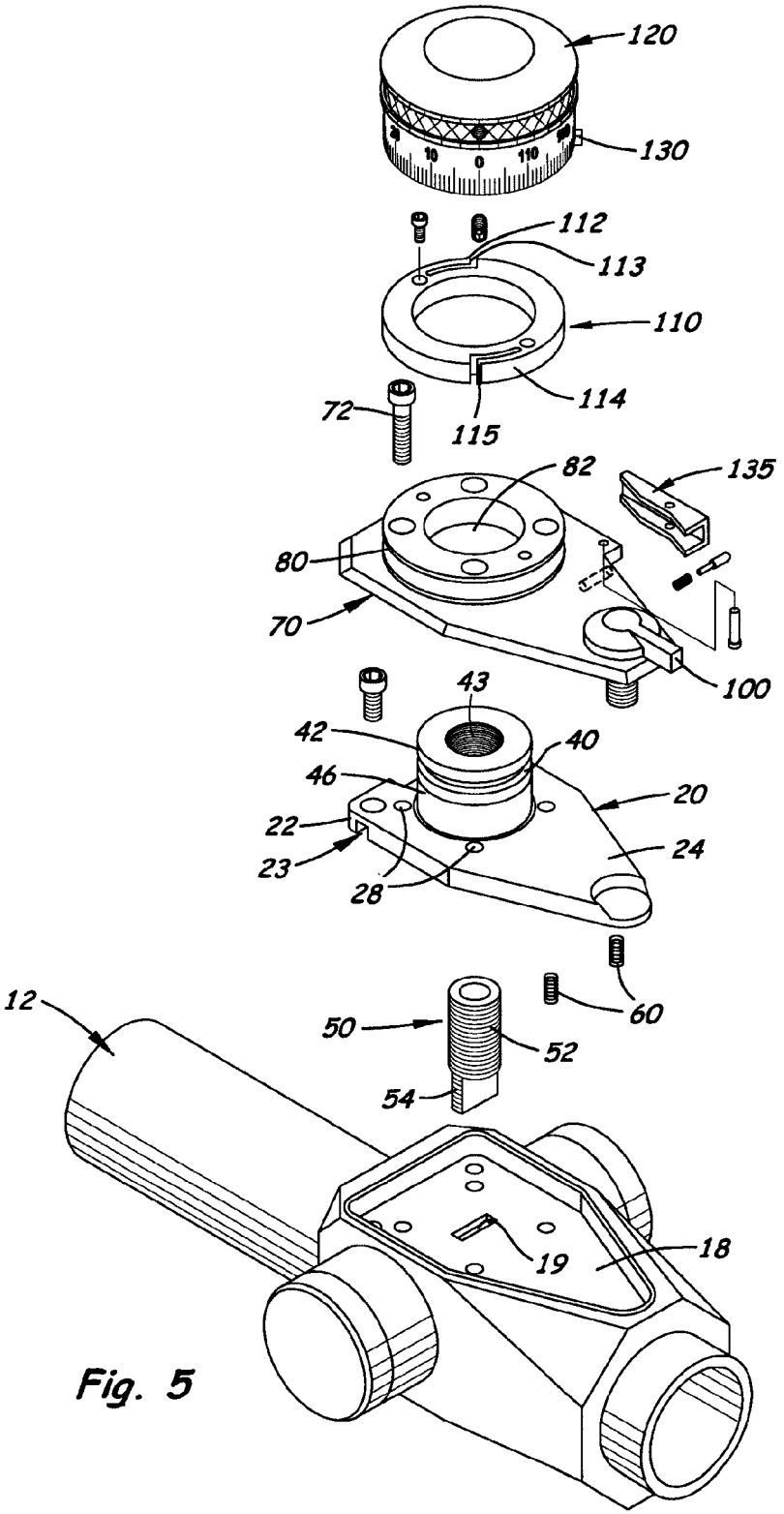
FIG. 5 is an isometric, exploded view of the high speed, adjustable elevation assembly.
Figure 6:
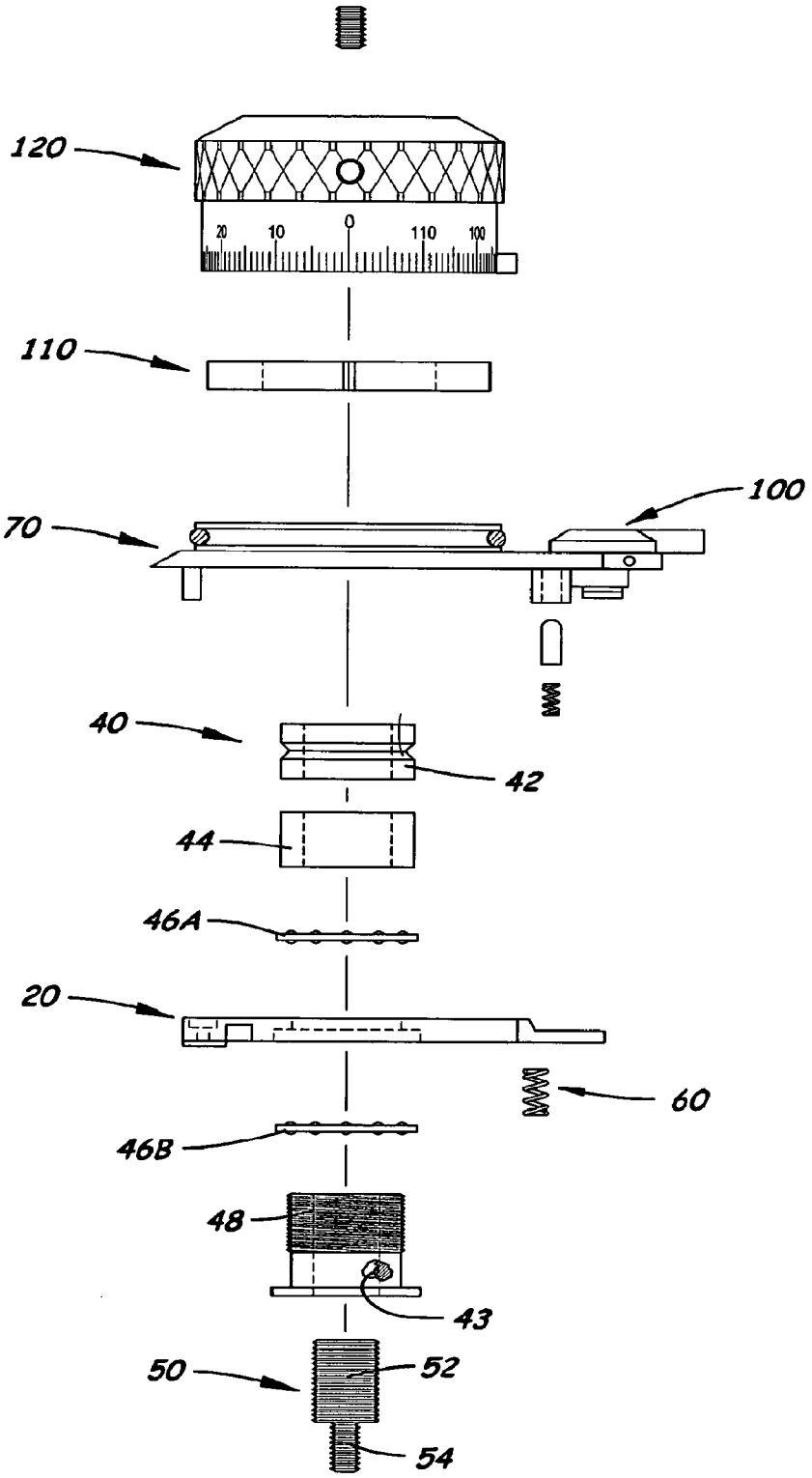
FIG. 6 is an exploded, side elevational view of the high speed, adjustable elevation assembly shown in FIGS. 4 and 5.
Figure 10:
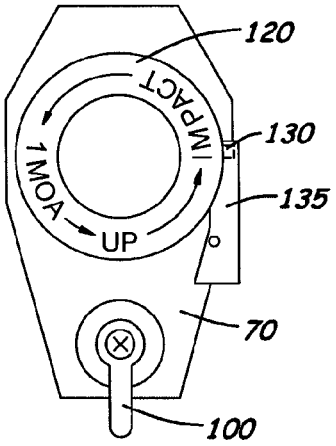
FIG. 10 is a top plan view of the elevation turn adjustment showing the quick-release tab mounted on the side of the course dial.
Figure 11:
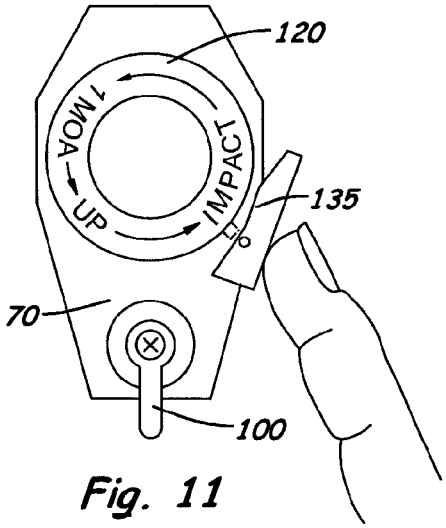
FIG. 11 is a top plan view of the elevation turn adjustment showing the release arm being pressed to release the stop tab so that the coarse dial may be rotated.
Figure 12:
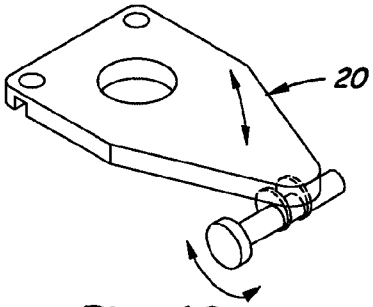
FIGS. 12-15 are illustrations of alternative structures used to raise and lower the rear portion of the hinge plate.
Figure 13:
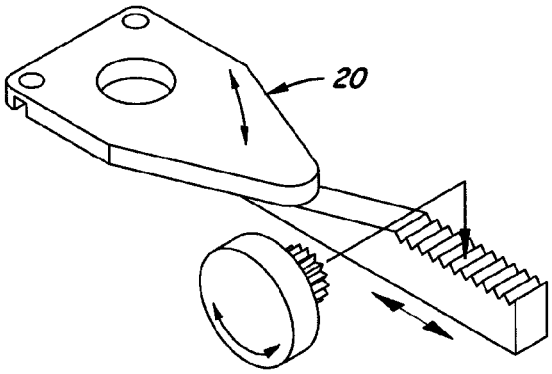
Figure 14:
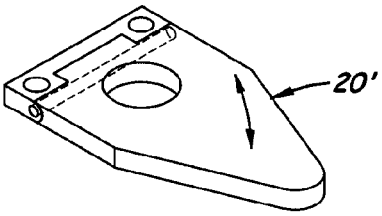
Figure 15:
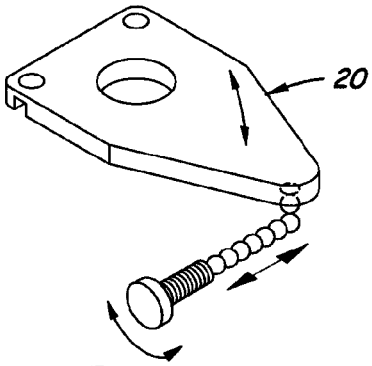

In the first embodiment, shown in FIGS. 4-6, the adjustment plate is a flex plate 20 affixed along its front edge to the mounting surface 18. The flex plate 20 includes a flat plate 21 with a transversely aligned groove 23 formed on its lower surface. The groove 23 enables the rear section of the flex plate 20 to bend upward when an upward force is exerted on the rear section 24 of the flex plate 20. The flex plate 20 is slightly beveled so that when the front section 22 of the flex plate 20 is attached to the mounting surface 18, the rear section 24 is slightly elevated above the mounting surface 18. One or more optional springs 60 are disposed between the rear section 24 and the mounting surface 18 to bias the rear section 24 upward.

The rotating post member 40 includes a top jam nut 42, an upper bearing support 44 and a lower bearing support 48. Located between the upper bearing support 44 and the top surface of the flex plate 20 is an upper bearing 46A. Located between the lower bearing support 48 and the bottom surface of the flex plate 20 is a second bearing 46B. Located longitudinally inside the post member 40 is a lead screw 50 with a threaded upper head 52 that connects to the internal threads 43 formed on the lower bearing support 48. The lead screw 50 includes a lower non-threaded key-shaped neck 54 that extends into a complimentary-shaped slotted bore 19 formed on the mounting surface 18. The slot 19 holds the lead screw 50 in a fixed non-rotating position on the mounting surface 18. The lead screw's neck 54 is sufficient in length to press against the proximal end of the erector tube 16 located inside the scope body 12 after assembly. When the post member 40 is rotated, the lead screw 50 advances or retracts from the slotted bore 19 which causes the proximal end of the erector tube 16 to move up and down inside the scope body 12.

In a second embodiment, shown in FIGS. 7-9, the flex plate 20 is replaced with a hinge plate 20'. The hinge plate 20' is affixed along its front section to a transversely aligned hinge pin 22' attaching it to the hinge joint 25' located in front of the hinge plate 20'. The hinge joint 25' is securely attached to the cover plate 70 located above the hinge plate 20' with two screws 29' allowing the hinge plate 20' to "float" in the mounting surface 18 after assembly. In the preferred embodiment, the hinge plate 20' has a flat thick front section and a thinner rear section 26' allowing the mounting of the cam follower ball 28. When the front section of the hinge plate 20' is pinned to the hinge joint 25' and attached to the cover plate 70, the cam follower ball 28 rests against cam face 108 discussed further below.

One or more optional springs 60' are disposed between the rear section of the hinge plate 20' and the mounting surface. 18. The springs 60' bias and help hold the rear section of the hinge plate 20' and cam follower ball 28 against the cam face 108 above the recessed surface 18.

Stacked over the flex plate 20 or the hinge plate 20' is a cover plate 70. Four threaded screws 72 are used to attach the cover plate 70 to the mounting surface 18. The screws 72 extend freely through non-threaded bores 27 formed on the flex plate 20 or hinge plate 20'. The bores 27 are slightly larger than the screws 72 and allow the flex plate 20 or hinge plate 20' to bend or pivot upward when the fine adjustment lever 100 is rotated.

In both embodiments, an O-ring seal assembly 80 is attached to the top surface of the cover plate 70. The O-ring seal assembly 80 includes a center bore 82 designed to slidingly receive the upper end of post member 40.

Attached to the rear section of the cover plate 70 is a rotating, fine adjustment lever 100. In the first embodiment shown in FIGS. 4-6, the fine adjustment lever 100 includes a handle 101 connected to a straight post 102 that advances or retracts against a recessed cavity area 26 formed on the adjustment plate. In a second embodiment shown in FIGS. 7-9, the fine adjustment lever, denoted 100', includes a handle 101' connected to a cam body 102'. The cam body 102' is perpendicularly aligned and extends upward from a lower collar 107'. Formed on the lower surface of the collar 107' is a cam face 108'. During use, the fine adjustment lever 100' may be rotated in one direction to move the cam face 108' to one of its stepped positions to apply pressure to the rear section 26' of flex plate 20 (not shown) or the hinge plate 20' thereby forcing the lead screw 50 downward against the erector tube 16. The fine adjustment lever 100' may also be rotated in the opposite direction to allow the rear section 26' to move upward via the springs 60'. The lead screw 50 and the proximal end of the erector tube 16 move upward. The fine adjustment spring 106 and the backed chisel point 104 engage the vertical splines on the side of the cam body 102' to execute precise movement of cam face 108'.

Attached to the cover plate 70 is a circular detent plate 110 with one spring 112 that presses against the laterally extending chisel point 114. The chisel point 114. includes a fine tooth [116] *115* located on its distal end. Attached over the detent plate 110 is a coarse dial 120 which includes vertically aligned splines (not shown) formed on its inside surface similar to the splines 144 shown with the windage dial 140. During operation, the chisel point 114 extends outward and engages the splines 144. In the preferred embodiment, the splines 144 are sufficient in quality and spacing so that one rotation of the coarse dial 120 equals 120 minutes of angle (or 2 degrees). Also in a preferred embodiment, a single rotation of the coarse dial 120 produces the full range of travel for the elevation adjustment.

During use, the coarse dial 120 is rotated for the desired target distance and then the fine adjustment lever 100 is rotated which causes the cam face 108 to be rotated on the cam follower ball 28 thereby pivoting the flex plate 20. The bending movement of the flex plate 20 or the pivoting movement of the hinge plate 20' finely adjusts the length of the lead screw 50 that extends into the scope body 12. The flex plate 20 or hinge plate 20' and the lead screw 50 are returned to their original positions by reversing the fine adjustment lever 100 or 100' and from the pressure exerted by the spring 60 against the mounting surface 18.

With any of the above-described embodiments, a horizontally aligned lock arm 135 may be pivotally attached to the cover plate 70. In one embodiment, the lock arm 135 includes a T-shaped tongue member 136 with upward and downward extending tabs 137, 138. The lock arm 135 is pivotally mounted, for example, on the cover plate 70 with a lock pin 134. Formed on the outer surface of the coarse dial 120 and windage dial 140 are two tabs 130 and 142, respectively. During operation, the two stop tabs 130, 142 engage the tabs 137, 138 on the lock arm 135 to prevent rotation and lock the dials 120, 140 at their respective zero points. The lock arm 135 is pressured by a spring 133 and a plunger 132 located at the end opposite the tongue member 136. During operation, the tongue member 136 is pressed inward thereby positioning the tabs 137, 138 below the dials 120, 140. The coarse dial 120 or windage dial 140 are then free to move from their zero points. When the elevation dial 120 or windage dial 140 are returned to their zero points, the lock arm 135 is released so that the tabs 137, 138 may engage the stop tabs 130, 142 on either dial 120, 140, respectively, to precisely return and hold the two dials 120, 140 at their original zero points.

Figure 16:
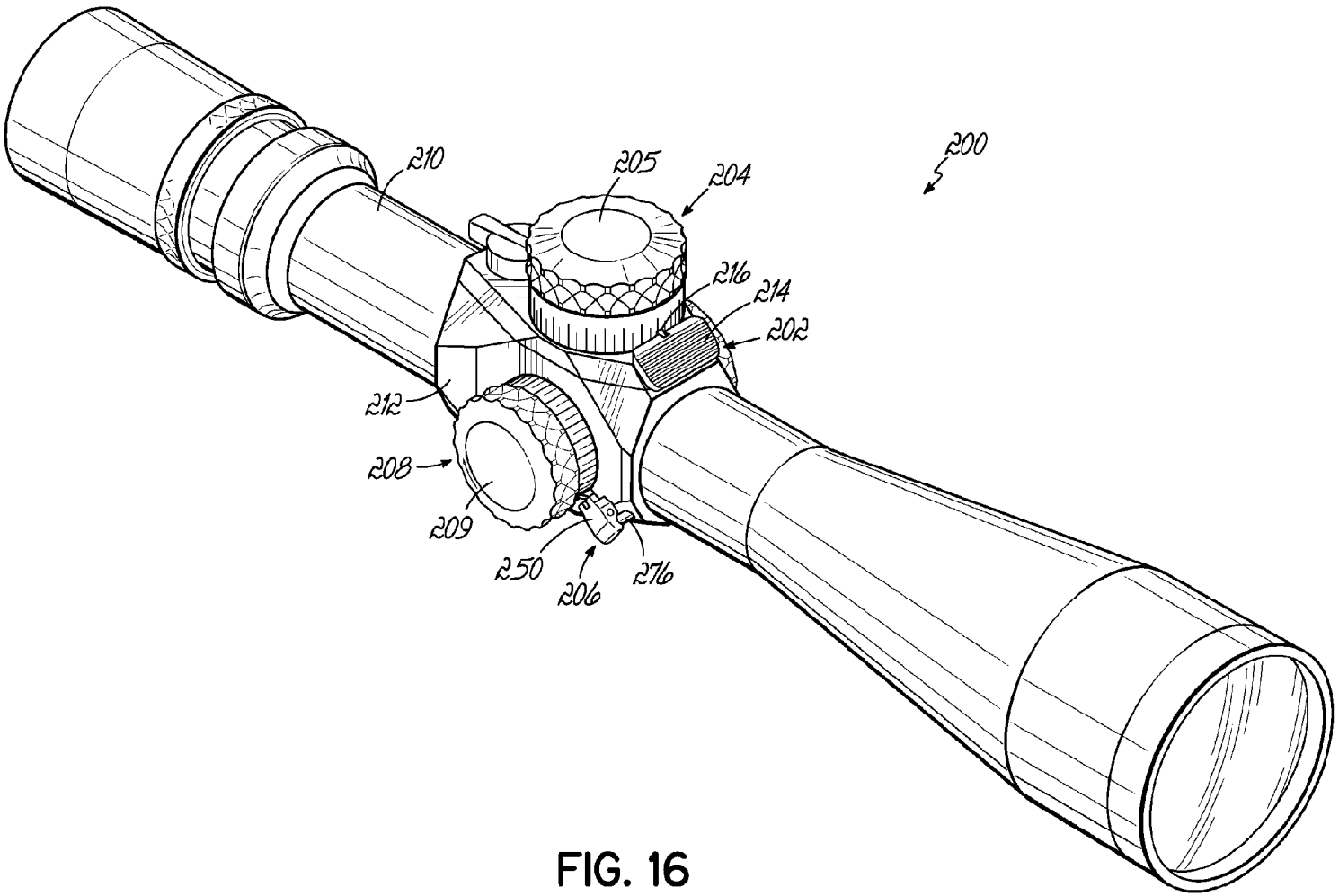
FIG. 16 is an isometric view of a riflescope having a first locking stop mechanism associated with an elevation adjustment assembly and a second locking stop mechanism associated with a windage adjustment assembly.
Figure 17:
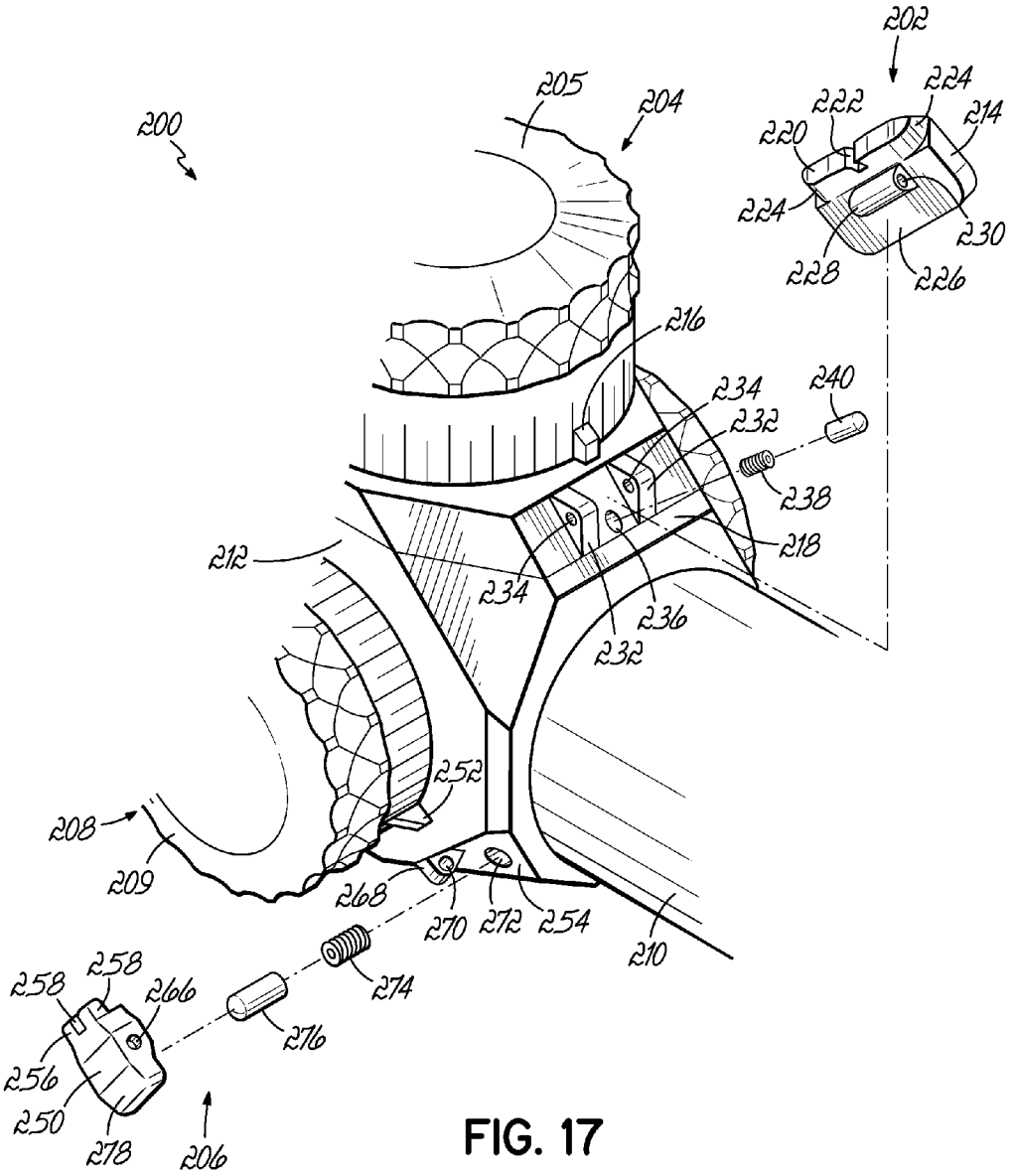
FIG. 17 is an isometric, exploded view of the first and second locking stop mechanisms of FIG. 16.
Figure 18:
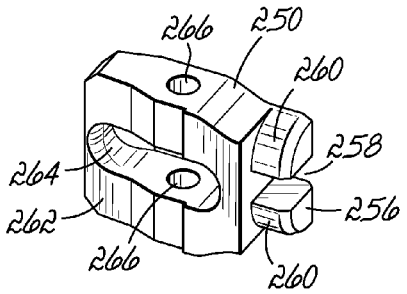
FIG. 18 is a bottom-side isometric view of the locking arm of the second locking stop mechanism.

Referring next to FIGS. 16-18, two alternative examples of locking stop mechanisms are shown in the context of a riflescope 200. The locking stop mechanisms provide structure for locking one or both of the riflescope's adjustment mechanisms and/or dials at pre-determined locations. In particular, a first locking stop mechanism 202 is associated with and interacts with an elevation adjustment assembly 204, and a second locking stop mechanism 206 is associated with and interacts with a windage adjustment assembly 208. The locking stop mechanisms 202, 206 may be engaged to release the elevation adjustment assembly 204 and the windage adjustment assembly 208, respectively.

The elevation and windage adjustment assemblies 204, 208 may be used to adjust the riflescope's elevation and windage settings and include dials 205, 209, respectively, that may be rotated by an operator. The riflescope 200 generally includes a scope body 210 and a saddle 212 for at least partially housing some of the components of the riflescope's m mechanisms.

Each locking stop mechanism 202, 206 generally includes a lock member and a stop member, with the lock member engageable with the stop member to prevent movement of the elevation adjustment assembly and windage adjustment assembly, respectively. As described herein, each lock member may be separately associated with the scope body 210, and each stop member may be associated with the elevation adjustment assembly 204 or the windage adjustment assembly 208. Each locking mechanism 202, 206 may be selectively engaged and disengaged by an operator. Alternative configurations may also be possible, wherein a lock member is associated with an elevation or windage adjustment assembly and a stop member is associated with a scope body.

One locking stop mechanism 202 (associated with the elevation adjustment assembly 204) includes a lock member in the form of a locking arm 214 and a stop member in the form of a stop tab 216. The locking arm 214 is pivotally coupled with the scope body 210, such as on an exterior surface 218, which may be part of the saddle 212. The stop tab 216 is included with the elevation adjustment assembly 204, such as on the dial 205.

The locking arm 214 includes a stop tab engagement portion 220 having a notch 222 for receiving the stop tab 216 Therein. Cammed surfaces 224 may be provided on the stop tab engagement portion 220 to encourage displacement or pivoting movement of the locking arm 214 as the stop tab engagement portion 220 is brought into contact with the stop tab 216 as the elevation adjustment assembly 204 is rotated. The locking arm 214 includes a bottom portion 226, and a pivot guide 228 is provided thereon.

The pivot guide 228 includes an opening 230 for receiving a pivot pin (not shown) for the pivotal coupling of the locking arm 214 with a portion of the scope body 210. The scope body 210 includes two pivot supports 232, such as on the surface 218, and each pivot supports 232 includes an opening 234. The pivot supports 232 and the pivot guide 228 are configured so the pivot guide 228 fits between the pivot supports 232, allowing a pivot pin to be inserted through the openings 230, 234 so that the locking arm 214 is pivotally coupled to the scope body 210. Of course, other similar or equivalent structure might also be used to pivotally couple the locking arm 214 with the scope body 210.

The locking arm 214 is thus generally pivotable about a transverse axis defined by the pivot guide 228. A portion of the locking arm 214, generally including the stop tab engagement portion 220, extends from the pivot guide 228 toward the dial 205, and another portion, generally opposite the stop tab engagement portion 220, extends from the pivot guide 228 away from the dial 205.

A bore 236 is provided in the scope body 210, such as near, but offset from, the pivot supports 232, and a spring 238 and plunger 240 may be at least partially received therein. Under pressure provided by the spring 238, the plunger 240 may act on the bottom portion 226 of the lock member, such as to urge the locking arm 214 toward an engagement position, which will be described more fully below. In particular, the plunger 240 may act on the part of the bottom portion 226 away from the stop tab engagement portion 220. An operator engagement portion 242 is provided generally opposite the bottom portion 226.

The stop tab 216, as shown, includes a narrow protrusion extending radially from a portion of the dial 205. The stop tab 216 may have any shape so long as it is generally configured to appropriately engage with the notch 222 in the locking arm 214 so as to prevent rotation as disclosed herein. The stop tab 216 may be situated generally near a base portion of the dial 205, but other positions may also be possible.

The locking arm 214 is generally moveable between at least two positions. In a first (engagement) position, the locking arm 214, and the stop tab engagement portion 220 in particular, are positioned so the stop tab 216 can engage the stop tab engagement portion 220, including its notch 222. The spring 238 and plunger 240 may act on the bottom portion 226 to urge the locking arm 214 toward or into this first position. For example, the locking arm 214 may be positioned so that as the dial 205 is rotated and the stop tab 216 approaches the notch 222, the stop tab 216 engages the stop tab engagement portion 220, including, if present, the cammed surfaces 224. By the stop tab 216 engaging a cammed surface 224, the locking arm 214 is gradually pivotally moved to allow the continued rotational movement of the dial 205 and the stop tab 216. For example, the locking arm 214 may be pivotally displaced so that the stop tab engagement portion 220 rises above the stop tab 216. The stop tab 216 may include shape characteristics or other features for cooperating with the cammed surfaces 224.

Once the stop tab 216 is rotated so that it arrives at the notch 222, the pressure of the plunger 240 may urge the locking arm 214 to pivot toward its first position and the stop tab 216 is captured in the notch 222. Further rotation of the dial 205 is limited or prohibited because the notch 222 constrains the movement of the stop tab 216.

In a second, disengaged position, the locking arm 214, including its stop tab engagement portion 220, are positioned so the stop tab 216 does not engage any part of the locking arm 214. In the second position, the dial 205 may be freely rotated without the stop tab 216 engaging any portion of the locking arm 214. The locking arm 214 may be put into its second position when an operator presses on part of the operator engagement portion 242, which may be the portion of the locking arm 214 opposite the pivot guide 228 from the stop tab engagement portion 220. When the operator so presses on the operator engagement portion 242, the plunger 240 is moved further into the bore 236, compressing the spring 238. When the operator releases the pressure on the operator engagement portion 242, the spring 238 tends to decompress, thereby urging the plunger 240 further out of the bore 236 so as to press on the bottom portion 226.

Thus, the first locking stop mechanism 202 serves to lock the position of the elevation adjustment assembly 204 as follows. When the dial 205 is rotated so that the stop tab 216 is caught in the notch 222 of the locking arm 214, the dial 205 is prevented from further rotation and the elevation adjustment assembly 204 is locked in position. An operator may disengage the locking arm 214 by pressing on the operator engagement portion 242, whereby the stop tab 216 is not engaged by the locking arm 214, and the dial 205 is free to rotate and the elevation adjustment assembly 204 may be adjusted.

Turning next to the second example locking stop mechanism 206, it shares some structural characteristics in common with the first locking stop member 202, and may operate according to similar principles.

The locking stop mechanism 206 (associated with the windage adjustment assembly 208) includes a lock member in the form of a locking arm 250 and a stop member in the form of a stop tab 252. The locking arm 250 is pivotally coupled with the scope body 210, such as on an exterior surface 254, which may be part of the saddle 212. The stop tab 252 is included with the windage adjustment assembly 208, such as on the dial 209.

The locking arm 250 includes a stop tab engagement portion 256 having a notch 258 for receiving the stop tab 252 therein. Cammed surfaces 260 may be provided on the stop tab engagement portion 256 to encourage displacement or pivoting movement of the locking arm 250 as the stop tab engagement portion 256 is brought into contact with the stop tab 252 as the windage adjustment assembly 208 is rotated, as described above. The locking arm 250 includes a bottom portion 262, and a recessed portion 264 is defined therein.

The locking arm 250 includes a pivot opening 266 for receiving a pivot pin 267 (shown in FIG. 19) for the pivotal coupling of the locking arm 250 with a portion of the scope body 210. The scope body 210 includes a pivot support 268, such as on the exterior surface 254, and the pivot support 268 includes an opening 270. The pivot support 268 and the pivot opening 266 in the locking arm 250 are configured so the pivot support 268 fits into the recessed portion 264, and so that the pivot pin 267 may be inserted through the openings 266, 270 such that the locking arm 250 is pivotally coupled to the scope body 210. Of course, other structure might also be used to pivotally couple the locking arm 250 with the scope body 210.

The locking arm 250 is thus generally pivotable about an axis defined by the pivot opening 266. A portion of the locking arm 250, generally including the stop tab engagement portion 256, extends from the pivot opening 266 toward the dial 209, and another portion, generally opposite the stop tab engagement portion 256, extends from the pivot opening 266 away from the dial 209.

A bore 272 is provided in the scope body 210, such as offset from the pivot support 268, and a spring 274 and plunger 276 may be at least partially received therein. Under pressure provided by the spring 274, the plunger 276 may act on the bottom portion 262 of the lock member, such as on the recessed portion 264, so as to urge the locking arm 250 toward an engagement position. In particular, the plunger 276 may act on the part of the bottom portion 262 away from the stop tab engagement portion 256. An operator engagement portion 278 is provided generally opposite the bottom portion 262.

The stop tab 252, as shown, includes a narrow protrusion extending generally radially from a peripheral portion of the dial 209. The stop tab 252 may have any shape so long as it is generally configured to appropriately engage with the notch 258 in the locking arm 250 so as to prevent rotation as disclosed herein. The stop tab 252 may be situated generally near a base portion of the dial 209, but other positions may also be possible.

The locking arm 250 is generally moveable between at least two positions. In a first, engagement, position, the locking arm 250, and the stop tab engagement portion 256 in particular, are positioned so the stop tab 252 can engage the stop tab engagement portion 256, including its notch 258. The spring 274 and plunger 276 may act on the bottom portion 262 to urge the locking arm 250 toward or into this first position. For example, the locking arm 250 may be positioned so that as the dial 209 is rotated and the stop tab 252 approaches the notch 258, the stop tab 252 engages the stop tab engagement portion 256, including, if present, the cammed surfaces 260. By the stop tab 252 engaging a cammed surface 260, the locking arm 250 is gradually pivotally moved to allow the continued rotational movement of the dial 209 and the stop tab 252. For example, the locking arm 250 may be pivotally displaced so that the stop tab engagement portion 256 rises above the stop tab 252. The stop tab 252 may include shape characteristics or other features for cooperating with the cammed surfaces 260.

Once the stop tab 252 is rotated so that it arrives at the notch 258, the pressure of the plunger 240 may urge the locking arm 250 to pivot toward its first position and the stop tab 252 is captured in the notch 258. Further rotation of the dial 209 is limited or prohibited because the notch 258 constrains the movement of the stop tab 252.

In a second, disengaged position, the locking arm 250, including its stop tab engagement portion 256, are positioned so the stop tab 252 does not engage any part of the locking arm 250. In the second position, the dial 209 may be freely rotated without the stop tab 252 engaging any portion of the locking arm 250. The locking arm 250 may be put into its second position when an operator presses on part of the operator engagement portion 278, which may be the portion of the locking arm 250 opposite the pivot bore 266 from the stop tab engagement portion 256. When the operator so presses on the operator engagement portion 278, the plunger 276 is moved further into the bore 272, compressing the spring 274. When the operator releases the pressure on the operator engagement portion 278, the spring 274 tends to decompress, thereby urging the plunger 276 further out of the bore 272 so as to press on the bottom portion 262.

Thus, the second locking stop mechanism 206 serves to lock the position of the windage adjustment assembly 208 as follows. When the dial 209 is rotated so that the stop tab 252 is caught in the notch 258 of the locking arm 250, the dial 209 is prevented from further rotation and the windage adjustment assembly 208 is locked in position. An operator may disengage the locking arm 250 by pressing on the operator engagement portion 278, whereby the stop tab 252 is not engaged by the locking arm 250, and the dial 209 is free to rotate and the windage adjustment assembly 208 may be adjusted.

Figure 19:
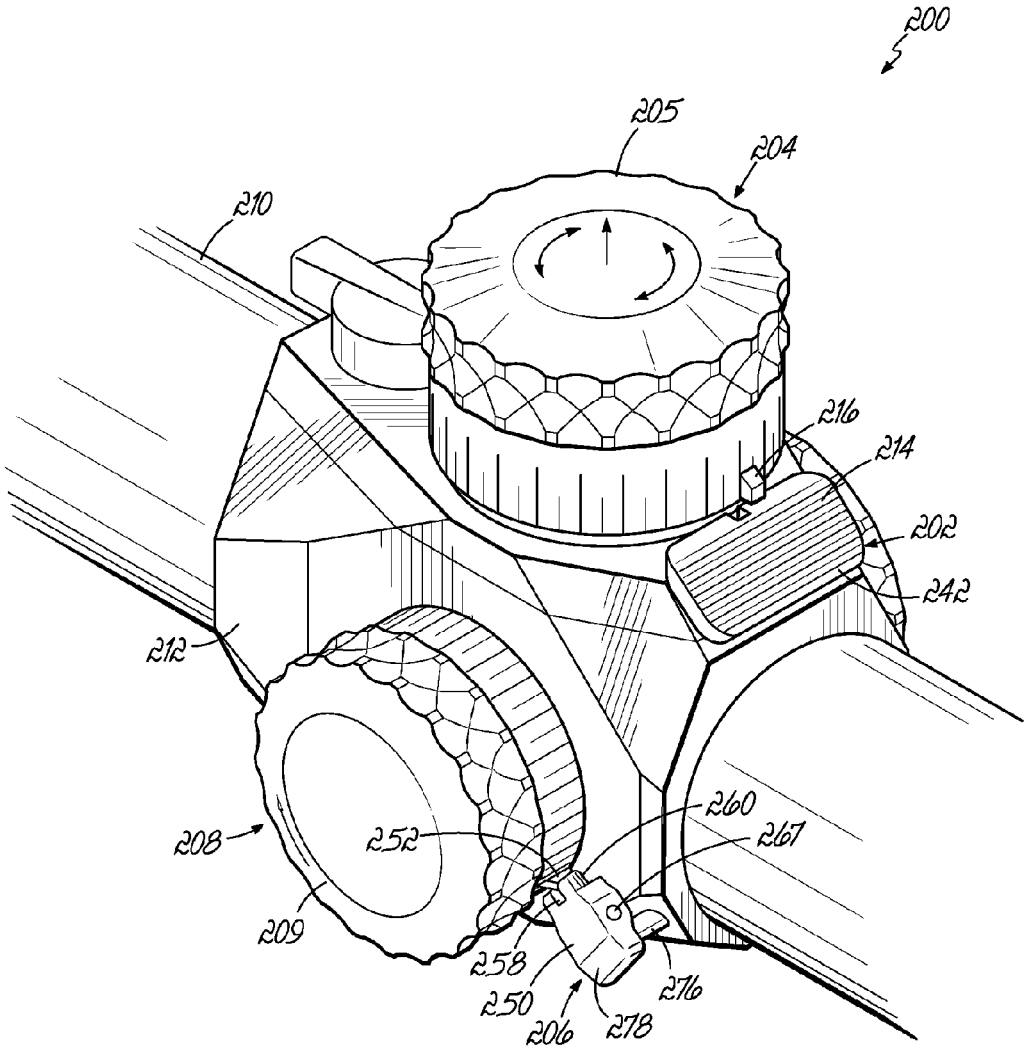
FIG. 19 is a close-up isometric view showing the first adjustment dial of an elevating turret rotated a full revolution.

The elevation or windage adjustment assemblies 204, 208 may be configured so that a reticle's full range of adjustment is achieved by a single rotation of the adjustment dial, such as dials 205, 209. Alternatively, either or both of the first and second locking stop mechanisms 202, 206 may be configured so that at least one of a stop member and lock member do not engage with the other upon a full rotation of the dial 205, 209 from the preselected setting. As illustrated in FIG. 19, the adjustment mechanism 204 may be the lifting turret type in which the dial moves axially toward or away from the scope body 210 as it is adjustably rotated. In a non-lifting style turret, the dial maintains it axial position relative to the scope body as it is rotated.

The adjustment dials 205, 209 may be configured to allow rotation in either direction from the preselected setting when the locking stop mechanisms 202, 206 are in the second, disengaged position. The adjustment dials 205, 209 may also include rotational position graduation indicia such that a preselected setting corresponds to a zero position of the adjustment dial. Also, the adjustment dials 205, 209 may be selectably positionable such that any setting within a reticle's range of adjustment can be selected as the preselected zero position.

*FIG. 20 shows an alternate embodiment of locking stop mechanisms 202, 206 in which a lock member 214', 250' is associated with and carried on either or both of the elevation and windage adjustment assembly dials 205, 209 and stop tabs 216', 252' are fixed in place on the scope body 210 or saddle 212.*

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept. The invention is therefore claimed in any of its forms or modifications within the legitimate and valid scope of the amended claims, appropriately interpreted in accordance with the doctrines of claim interpretation, including the doctrine of equivalents.

Having described the invention, what is claimed is:

1. A locking stop mechanism for a riflescope that includes at least one rotatable reticle adjustment dial mounted on a scope body, comprising: a stop member on the adjustment dial at a preselected position; a lock member, on the scope body, including at least one cam surface configured to cause displacement of the lock member when contacted by the stop member as the adjustment dial is rotated to the preselected setting, the lock member being positioned to engage the stop member upon rotation of the adjustment dial to a preselected setting, and the lock member configured to prevent rotation of the adjustment dial in either direction when engaged with the stop member while allowing free rotation in at least one direction when the lock member is manually displaced and when the stop member is not engaged with the lock member at the preselected setting.

2. The locking stop mechanism of claim 1, wherein the lock member includes a locking arm pivotably mounted on the scope body.

3. The locking stop mechanism of claim 2, wherein the lock member is spring biased toward an engagement position.

4. The locking stop mechanism of claim 1, wherein the adjustment dial includes rotational position graduation indicia and the preselected setting corresponds to a zero position of the adjustment dial.

5. The locking stop mechanism of claim 4, wherein the dial is selectably positionable such that any setting within a reticle's range of adjustment can be selected as the preselected zero position.

6. The locking stop mechanism of claim 1, wherein at least one of the stop member and lock member is configured not to engage with the other upon a full rotation from the preselected setting.

7. The locking stop mechanism of claim 1, wherein the adjustment dial is configured to allow rotation in either direction from the preselected setting when the lock member is manually displaced.

8. The locking stop mechanism of claim 1, wherein the adjustment dial is configured such that a reticle's full range of adjustment is achieved by a single rotation of the adjustment dial.

9. A locking reticle adjustment dial stop mechanism for a riflescope that includes perpendicularly aligned elevation and windage dials both mounted on a scope body, comprising:

a stop tab mounted on each of the elevational windage dials;

a lock arm pivotally mounted on said scope body, said lock arm including a tongue portion with substantially upwardly and downwardly extending engagement portions sufficient in length to simultaneously engage each stop tab on said dials; and said lock arm being spring biased into an engagement position that lock the dial to a set zero point and configured such that the lock arm may be manipulated to allow the dials to move freely from a set point and when released allowing each dial to be relocked to the set zero point.

*10. A locking stop mechanism for a riflescope that includes at least one rotatable reticle adjustment dial mounted on a scope body, comprising:*

*a stop member on one of the adjustment dial or the scope body; and*

*a lock member on the other of the adjustment dial or the scope body, the lock member including at least one cam surface configured to cause displacement of the lock member when contacted by the stop member as the adjustment dial is rotated to a preselected setting, the lock member being positioned to engage the stop member upon rotation of the adjustment dial to the preselected setting, and the lock member configured to prevent rotation of the adjustment dial in either direction when engaged with the stop member while allowing free rotation in at least one direction when the lock member is manually displaced and when the stop member is not engaged with the lock member at the preselected setting.*

*11. The locking stop mechanism of claim 10, wherein the stop member is provided on the scope body and the lock member is provided on the adjustment dial.*

*12. The locking stop mechanism of claim 10, wherein the stop member is provided at a preselected location on the one of the adjustment dial or the scope body.*

* * * * *